Patented Oct. 23, 1934

1,977,927

UNITED STATES PATENT OFFICE 1,977,927

PROCESS OF MAKING BUTTER

Herman D. Wendt, West Chester, Pa., assignor to Milk Processes, Inc., Philadelphia, Pa., a corporation of Pennsylvania No Drawing. Application February 23, 1934, Serial No. 712,652

14 Claims. (Cl. 99—11)

The present invention pertains to the art of butter making and has had as a primary object the development of a process of producing butter which will be more economical from the standpoint of space, labor and equipment than butter making processes in current use.

A further object of the invention has been to provide a process of making butter by the practice of which the quality may be accurately controlled by the addition of ingredients to a cream of unusually high butter fat content, which is to be converted into butter, in such a manner that the ultimate proportions of ingredients may be accurately controlled and varied within wide limits depending upon the composition of the butter desired, and in which such accurate control may be effected in connection with varying grades of cream.

A third object of the invention has been to provide a process of butter making by means of which butter of good quality may be produced from cream of such poor quality that high grade butter could not be produced therefrom by ordinary churning methods.

Further objects and advantages of the invention will be obvious from a reading of the subjoined specification.

In the preferred practice of the invention, cream or milk of normal butter fat content is heated to a temperature above the temperature at which its butter fat content becomes liquid and the heated milk product is passed through a centrifugal separator operating at high speed or reduced capacity to remove from the milk product a large portion of its liquid vehicle and thereby produce a cream of high butter fat content, as described in my prior Patent No. 1,791,068 of February 3, 1931. The centrifugal separator should be adjusted to produce cream having a butter fat content between 65% and 85%, as described in that patent.

The cream discharged by the centrifuge is carefully cooled to a temperature sufficiently low to render it plastic and of good keeping quality; e. g., to a temperature below 50° F. The cream may be stored in this condition until it is desired to convert it into butter or it may be shipped to a central point at which such conversion is adapted to take place.

In the step of converting the high butter fat content cream into butter, the cream is first worked to a moderate degree sufficient to cause a granulation or breaking up of the cream particles. Such working may, for example, comprise passage between the rolls of a conventional butter working machine or the cream may be subjected to other suitable types of milling action to condition it for absorption of liquid, as described hereinafter. Great care should be taken, in connection with such working, however, to avoid conversion into butter at this stage of the operation as such conversion would prevent absorption of liquid and consequent control of the quality of the butter by the steps about to be described.

When the moderate working of the cream has proceeded to an extent sufficient to condition such cream for the absorption of a substantial proportion of moisture without conversion of the cream to a liquid condition, a liquid is added to the cream and absorbed thereby. The liquid added will vary with the proportions of ingredients of the cream under treatment and the nature and quality of the butter which is desired. Such liquid may comprise sweet or cultured milk or cream or starter or it may comprise water or another suitable liquid to which starter or flavoring substances may or may not have been added. The purpose of adding a liquid at this stage of the operation is to blend with the liquid vehicle in which the butter fat globules are suspended in the cream another liquid adapted to vary the composition thereof. If the liquid vehicle of the cream does not contain as large a proportion of solids not fat as are desired in the finished butter such solids are incorporated in the added liquid. If, on the other hand, the acidity of the cream is not as high as that desired in the finished butter, the added liquid should contain acid. In cases in which it is desirable or necessary to add a relatively large proportion of the supplemental liquid in order to obtain a cream product having a liquid vehicle possessing the desired ingredients and proportions, the liquid should be added to the cream in increments and the cream should be moderately worked or milled during the addition of the supplemental liquid and between successive steps of addition.

The liquid added to the cream may contain salt, coloring matter and other constituents in the desired proportions, the addition of such ingredients at this stage of the operation facilitating their dispersion throughout the mass of material which is to be converted into butter, as this mass contains liquid in the continuous phase at this stage of the operation and the dispersion of soluble constituents in the mass is accordingly rapid and complete.

By carefully observing the precautions set forth above, an amount of supplemental liquid may be added to the cream varying between 10 and 50% by weight with respect to the high butter fat cream to which it is added without rendering the cream liquid.

After the supplemental liquid is added to the cream product and absorbed thereby as described above, the thus diluted cream product is further worked by the application of pressure thereto until its phase is reversed and excess liquid is expelled in the form of buttermilk. Such supplemental working may, like the initial working of the cream, constitute successive passage of the cream through the rolls of a butter working machine.

In cases in which the supplemental liquid blended with the high butter fat content cream constitutes sweet or sour cream, it has been found that the butter fat content of the added cream remains with the butter upon the expulsion of the surplus liquid as buttermilk. By adding cream of selected quality in the practice of the invention, it is therefore possible to improve the quality of the butter produced by the incorporation of butter fat of more desirable flavor than that of the neutralized high butter fat content cream with which it is incorporated.

From the above discussion it will be evident that the practice of the present invention renders possible the production of a butter of accurately controlled composition, the production of a butter of the desired composition requiring merely an analysis of the high butter fat cream under treatment and addition of liquid in proportions and amounts necessary to blend with the liquid vehicle of the cream under treatment to produce a liquid vehicle having the desired composition.

In many cases it is desirable to remove from the cream under treatment certain of its ingredients and to replace these ingredients in the finished butter with other ingredients differing in composition or superior in quality to the removed ingredients. In such case the milk product from which the cream is produced may be subjected to washing and/or other purifying operations to remove undesired ingredients and these ingredients may be replaced by others of similar or different character incident to the dilution of the high butter fat content cream prior to its conversion into butter.

In the performance of the cooling operation by means of which the high butter fat content cream discharged by the centrifugal separator is converted into a solid plastic product, it is important that agitation of the mass of cream under treatment be carefully avoided in order to prevent conversion of this cream into butter at this stage of the operation. Cooling apparatus by which such object may be accomplished is described in my co-pending application Serial No. 705,209, filed January 4, 1934 for Manufacture of plastic cream. It is also important that the conversion of the cream product into butter be avoided during the initial working operation by means of which the plastic cream product is conditioned for absorption of further liquid. The working operation by which such conditioning is effected should be carefully carried out in order to adequately condition the cream for such absorption without effecting conversion of any part of the cream into butter. It would, of course, be impossible to change the constitution of any part of the cream product with respect to which such conversion took place prior to the addition of liquid.

The invention possesses especial importance when applied to the manufacture of butter from sour milk products. Such products, when received at the creamery, frequently contain ingredients in very bad condition. The curd of received cream, for example, is often in such poor condition as the result of the action of bacteria and acids thereon that it is unsatisfactory for butter making. An important feature of the invention constitutes the discovery of a process by which such undesired constituents may be removed and replaced by others to produce a high grade butter. In accordance with the present invention sour cream may be subjected to neutralizing and washing operations adapted to reduce the acidity of the cream and remove a large proportion of the undesired curd and neutralizing products and a high butter fat content cream produced from such neutralized and washed cream by centrifuging may thereafter be diluted with milk to replace the removed solids and produce a cream which may be converted into butter of a quality comparable to that produced from sweet cream. Such cream may also have live steam or other gases passed therethrough in order to remove volatile impurities tending to give the resulting product an offensive odor. In the preferred practice of the invention, the washing and steam-treating operations are performed in connection with the subjection of the neutralized sour cream to centrifugal separation to produce a cream containing from 65 to 85% butter fat.

According to a typical example of the practice of the invention, sour cream is first neutralized by the addition of a neutralizing agent constituting a mixture of sodium carbonate and sodium hydroxide until its acidity is reduced to approximately 0.05%, the cream being heated in vats to approximately 110° F. during action of the neutralizer thereon in order to facilitate the curd dispersing action of the neutralizer. The neutralized cream is then passed into confluence with a flowing stream of hot water, and live steam is injected into the flowing stream of cream and hot water during the passage thereof to a centrifugal separator. The ingredients are vented before reaching the separator by passage to the open feed cup of the separator, thereby allowing steam to escape and carry with it volatile impurities derived from the cream. The steam serves the dual function of removing impurities from the cream and of flash-pasteurizing the cream during its passage to the separator. Such flash-pasteurizing immediately prior to the centrifugal separation constitutes an important feature of the invention, as prolonged contact of steam or hot water with the neutralized milk product has a tendency to cause a saponification thereof and accordingly prevents efficient performance of the separating function.

The mixture of cream and water is next passed through the centrifugal separator, the water serving to wash the cream and remove therefrom a large part of its curd content and of the products of reaction of the neutralizer upon the cream. The purified cream discharged from the separator is cooled in the same manner as described in connection with the treatment of ordinary cream described above and the subsequent treatment of the cream to convert it into butter is the same as described in the preceding example.

While the addition of hot water and live steam to a stream of cream flowing to the centrifugal separator has been described above only in connection with the treatment of sour cream, these features of the invention are likewise applicable to the treatment of sweet cream which is to be treated in the practice of the invention. There is some tendency on the part of creams subjected to a large amount of centrifugal force for the purpose of producing creams of very high butter fat content, such as that discussed above, to undergo the phenomenon of separation of a part of their butter fat content in the centrifugal separator in the form of butter oil. This phenomenon is known as oiling and a feature of the invention consists in the discovery that the step of heating a cream which is to be subjected to such centrifugal separation to a temperature above 150° F. effectively precludes the occurrence of this phenomenon to any marked degree. I, therefore, prefer in connection with the treatment of sweet cream as well as sour cream, to subject such cream to a temperature above 150° F. in order to prevent the occurrence of oiling. In connection with very sour creams, temperatures which are considerably higher than 150° F. are sometimes desirable in order to prevent the occurrence of this phenomenon and in the treatment of very sour creams I therefore prefer to add steam under conditions adapted to heat the cream to a temperature in excess of 180° F. The added steam thus serves the function of preventing oiling in addition to its functions of removing impurities and pasteurizing the cream product.

Modifications will be obvious to those skilled in the art and I do not therefore wish to be limited except by the scope of the sub-joined claims. In these claims, I wish it to be understood that the terms "neutralization" is used in its sense commonly accepted in the butter-making industry; i. e., as including the reduction or standardizing of acidity by means of alkali, whether or not such alkali is added in sufficient quantity to react with all of the acid present.

I claim:

1. A process of producing butter from cream containing over 65% butter fat which comprises working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream and thereafter working the cream further to convert it into butter.

2. A process of producing butter from cream containing over 65% butter fat which comprises working the cream at a temperature sufficiently low to maintain the cream in a plastic condition and to such a moderate degree as to avoid reversal of phase of the cream, adding a starter to the moderately worked cream to effect a blend between the added starter and the liquid content of the cream and thereafter working the cream further to convert it into butter.

3. A process of producing butter from cream containing over 65% butter fat which comprises working the cream at a temperature sufficiently low to maintain the cream in a plastic condition and to such a moderate degree as to avoid reversal of phase of the cream, adding water to the moderately worked cream to effect a blend between the added water and the liquid content of the cream and thereafter working the cream further to convert it into butter.

4. A process of producing butter from cream containing over 65% butter fat which comprises working the cream at a temperature sufficiently low to maintain the cream in a plastic condition and to such a moderate degree as to avoid reversal of phase of the cream, adding milk to the moderately worked cream to effect a blend between the added milk and the liquid content of the cream and thereafter working the cream further to convert it into butter.

5. A process of producing butter which comprises subjecting a milk product to a washing operation to remove undesired constituents therefrom, thereafter subjecting the resulting product to centrifugal force to produce a cream containing over 65% butter fat, cooling the resulting cream to a plastic condition, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream without destroying the plasticity of the cream and thereafter working the cream further to convert it into butter.

6. A process of producing butter which comprises passing steam through a milk product to remove undesired volatile ingredients therefrom, subjecting the resulting milk product to centrifugal force to produce a cream containing over 65% butter fat, cooling the resulting cream to a plastic condition, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream without destroying the plasticity of the cream and thereafter working the cream further to convert it into butter.

7. A process of producing butter which comprises subjecting a milk product to a washing operation and passing steam therethrough to remove undesired constituents therefrom, subjecting the resulting milk product to centrifugal force to produce a cream containing over 65% butter fat, cooling the resulting cream to a plastic condition, moderately working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream without destroying the plasticity of the cream and thereafter working the cream further to convert it into butter.

8. A process of producing butter which comprises passing a milk product continuously to a centrifugal separator, passing hot water into confluence with the flowing stream of milk product, subjecting the mixture of hot water and the milk product so produced to centrifugal force to produce a cream containing over 65% butter fat, cooling the resulting cream to a plastic cream, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream without destroying the plasticity of the cream and thereafter working the cream further to convert it into butter.

9. A process of producing butter which comprises passing a milk product continuously to a centrifugal separator, passing hot water into confluence with the flowing stream of milk product, passing steam into the flowing stream of milk product and water, venting the steam passed into said flowing stream, thereafter subjecting the mixture of ingredients to centrifugal force to produce a cream containing over 65% butter fat, cooling the resulting cream to a plastic cream, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream without destroying the plasticity of the cream and thereafter working the cream further to convert it into butter.

10. A process of producing butter which comprises passing a milk product continuously to a centrifugal separator, passing steam into the flowing stream of milk product, venting the steam passed into said flowing stream and thereafter subjecting the mixture of ingredients to centrifugal force to produce a cream containing over 65% butter fat, cooling the resulting cream to a plastic cream, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream and thereafter working the cream further to convert it into butter.

11. A process of producing butter which comprises heating a milk product to a temperature above 150° F., thereafter subjecting the milk product to centrifugal force to produce a cream containing over 65% butter fat, cooling the resulting cream to a plastic condition, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream and thereafter working the cream further to convert it into butter.

12. A process of producing butter from sour milk products which comprises neutralizing a sour milk product from which butter is to be produced, thereafter heating the sour milk product to a temperature above 150° F., subjecting the heated milk product to centrifugal force to produce a cream containing over 65% butter fat, cooling the resulting cream to a plastic condition, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream and thereafter working the cream further to convert it into butter.

13. A process of producing butter from sour milk products which comprises neutralizing a sour milk product from which butter is to be produced, thereafter heating the sour milk product to a temperature above 180° F., subjecting the heated milk product to centrifugal force to produce a cream containing over 65% butter fat, cooling the resulting cream to a plastic condition, working the cream at a temperature sufficiently low to maintain the cream in a plastic condition and to such a moderate degree as to avoid reversal of phase of the cream, adding liquid to the moderately worked cream to effect a blend between the added liquid and the liquid content of the cream and thereafter working the cream further to convert it into butter.

14. A process of producing butter from a sour milk product which comprises neutralizing the sour milk product, heating the neutralized sour milk product to a temperature facilitating the centrifugal treatment thereof, passing the neutralized and heated sour milk product through a centrifugal separator to produce a cream containing over 65% butter fat content, and finally diluting the high butter fat content cream so produced with a liquid vehicle adapted to blend with the liquid vehicle of the cream and converting the diluted cream into butter by mechanical manipulation thereof.

HERMAN D. WENDT.